Figure 1:
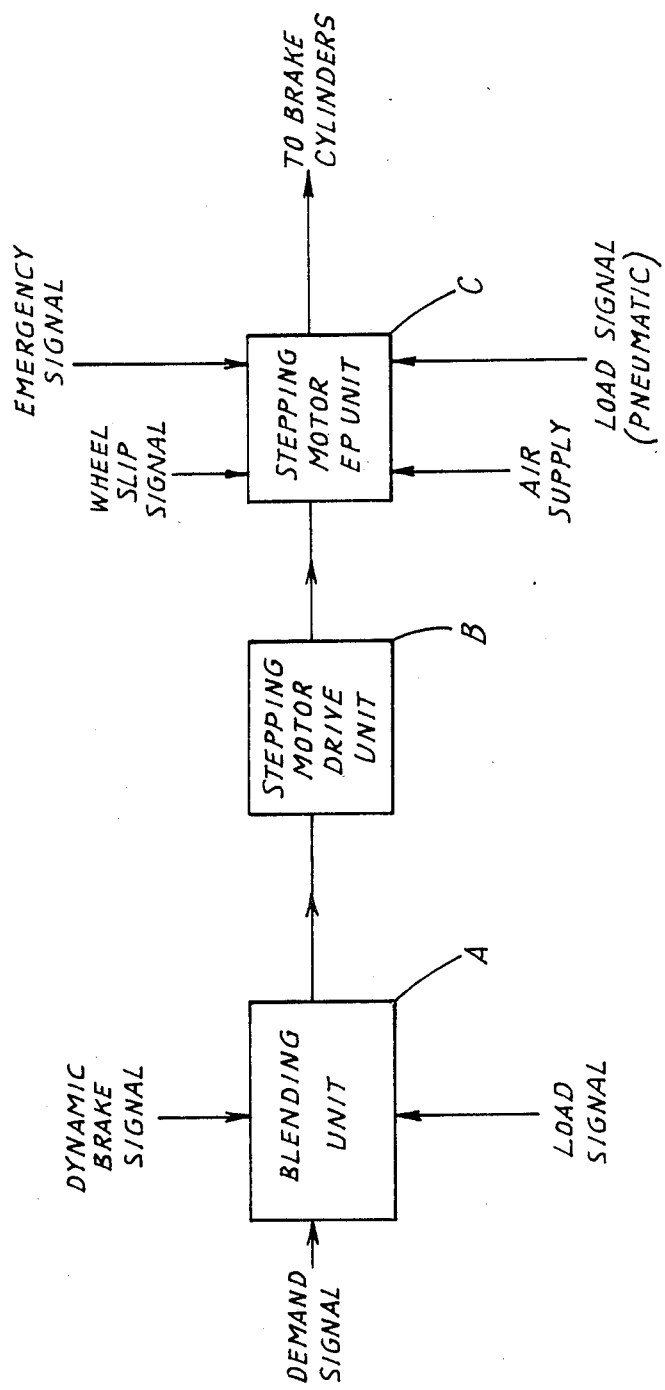

United States Patent [19]

Washbourn

[11] Patent Number: 4,572,586
[45] Date of Patent: Feb. 25, 1986

[54] BRAKE SYSTEM INCORPORATING A STEPPING MOTOR

[75] Inventor: Jack Washbourn, Chippenham, England

[73] Assignee: Westinghouse Brake & Signal Co., Wiltshire, England

[21] Appl. No.: 606,264

[22] Filed: May 2, 1984

[30] Foreign Application Priority Data

May 3, 1983 [GB] United Kingdom ............... 8312025

[51] Int. Cl.⁴ ............................................. B60T 13/68
[52] U.S. Cl. .................................... 303/15; 303/22 R
[58] Field of Search ..................... 188/195; 251/133;
303/3, 15, 20, 22 R, 40

[56] References Cited

U.S. PATENT DOCUMENTS 1,842,497  1/1932  Whitaker ........................ 303/20 X
2,470,470  5/1949  Carbon ............................ 251/133 X Primary Examiner—Duane A. Reger
Attorney, Agent, or Firm—Larson and Taylor

[57] ABSTRACT

An electro-pneumatic brake system in which an electric brake demand signal controls the energization of a stepping motor. The shaft of the motor is threadedly engaged with a captive nut which bears against an abutment carried by a brake controlling valve, the opening of which determines brake actuating pressure downstream of the valve. Rotation of the motor therefore directly controls the brake pressure by movement of the valve.

7 Claims, 2 Drawing Figures

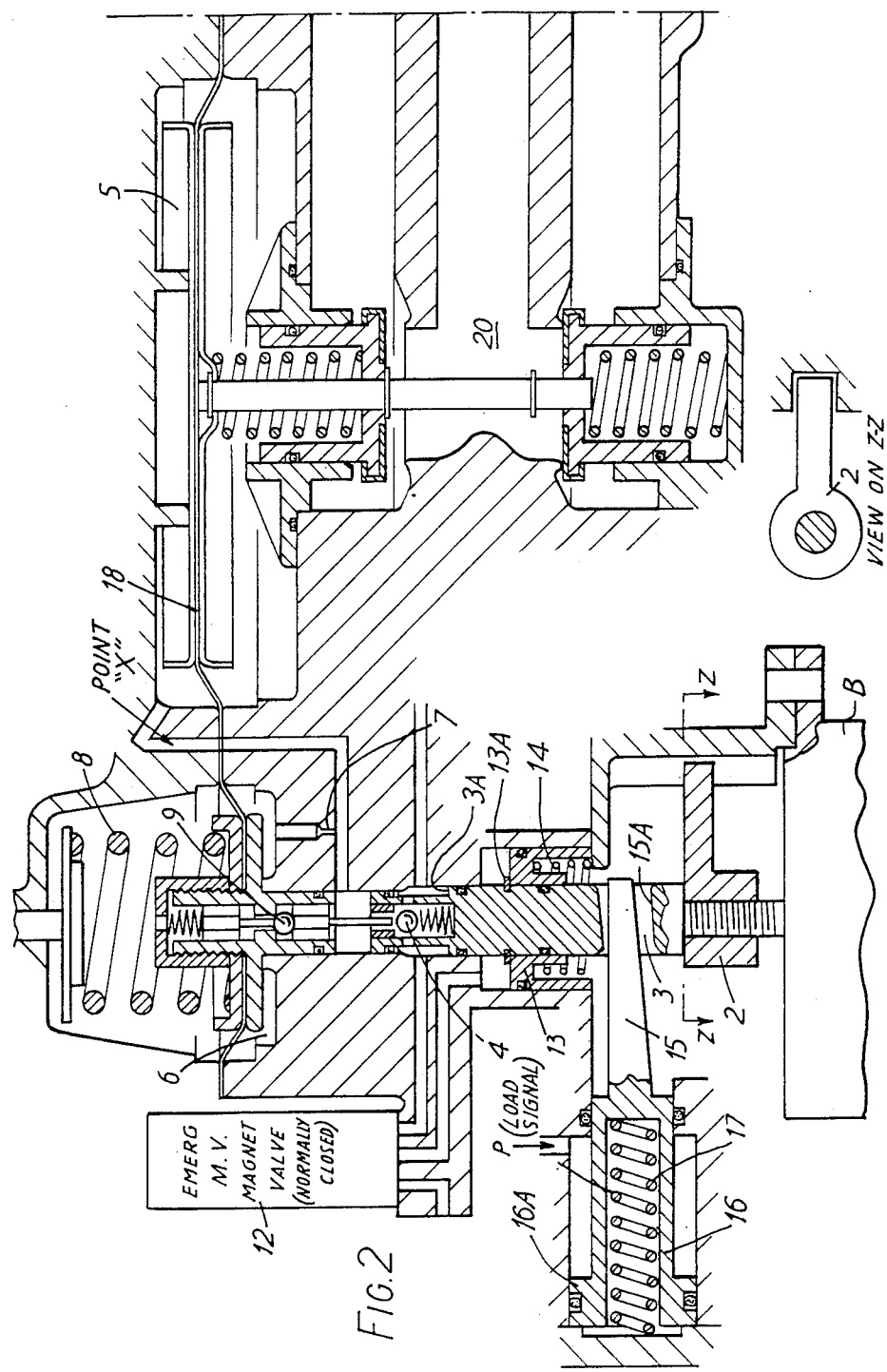

BRAKE SYSTEM INCORPORATING A STEPPING MOTOR

This invention relates to an electro-pneumatic brake system.

Our earlier published U.K. patent specification number 919519 shows an electrically controlled pneumatic brake system employing a magnet which uses an armature to clock round a ratchet wheel. The ratchet wheel drives a captive nut so as to move a valve actuator in the required direction to open or close the valve.

The problem with such a simple device is that the speed of response is limited. It is only capable of responding at speeds corresponding to telephone dialling speeds. While this may be satisfactory for freight car braking it is not good enough for a transit system using electric traction such as an underground train system or overground tram system where much more flexibility and control, and faster action, is needed.

According to the invention there is provided an electro-pneumatic brake system in which an output pneumatic pressure is determined by the opening of a pneumatic valve, subject to a source of pneumatic pressure, in accordance with an electrical signal connected to energise a stepping motor having an output shaft, stepwise rotatable to control the opening of the pneumatic valve.

The invention also comprises a method of converting electric signals to pneumatic signals in an electric magnetic brake system, including applying the electric signals to a stepping electric motor, employing the stepped rotational output of the electric motor to open a valve in a pneumatic circuit whereby the pneumatic pressure downstream of the valve is proportional to the number of steps effected by the stepping motor.

A stepping motor, which uses a rotor positioned by magnetic alignment of iron teeth on the stationary and rotating parts of the motor is fast, flexible, and very reliable because it has no brushes and therefore a long life. A variable reluctance stepping motor or a hybrid stepping motor may be used for example.

Such a stepping motor is capable of actuating at very high rates, e.g. 10,000 steps per second.

It is ideal to be operated by a micro-processor which can be so designed and programmed as to blend all the different braking arrangements and to take account of all the variables such as load. It can blend the normal braking with emergency braking and with a load sensitive braking etc.

Preferably the stepping motor either rotates a shaft on which there is a nut which cannot rotate but moves axially along the shaft so as to initiate operation of the pneumatic device.

The nut may, for example, move an inlet valve seat of the pneumatic device so as to allow flow of air producing an output proportional to the movement of the seat and therefore proportional to the number of steps made by the stepping motor. Alternatively the nut may move an inlet valve relatively to a fixed seat so as to achieve the same effect.

In one arrangement the nut abuts one end of a valve cage of a pilot valve so that the cage moves axially with the nut, the cage being preferably held against the nut by supply pressure acting on an annular area on the cage. The pilot valve may in turn operate a relay valve.

In addition into the same pneumatic valve that operates the main braking system, there may be incorporated:

(a) the emergency braking control, and
(b) the load cut-off

These two items a and b could be used with a standard motor with feed back or an ordinary DC motor such as a synchronous motor with an optical decoder. It is not essential that they should be used with a stepping motor.

The invention will now be described, by way of example, with reference to the embodiment illustrated in the accompanying drawings, in which:

FIG. 1 is a block diagram illustrating the use of a stepping motor in an electro-pneumatic braking system in accordance with the present invention; and FIG. 2 is a section through a stepping motor controlled pneumatic valve.

In FIG. 1 is shown a blending unit A which receives and blends electrical signals representing brake demand, train load and dynamic braking. In this unit an output is produced representing brake demand less available dynamic braking but modified in accordance with train loading. The signal therefore indicates the required degree of pneumatic braking. This signal is fed in the form of a series of pulses or digital signals, to a stepping motor drive unit B which produces a rotational output proportional to the number of steps and therefore to the required pneumatic braking.

A stepping motor B (FIG. 1) drives a nut 2 in the stepping motor E.P. unit shown in detail in FIG. 2. The nut 2 cannot rotate and, therefore, moves axially when the motor shaft rotates. The threaded part of the shaft may be formed integrally with the output shaft of the stepping motor.

The nut 2 abuts the lower end of the valve cage 3 of a pilot valve so that the cage moves axially with the nut. The cage is always held against the nut by supply pressure acting downwardly on the annular area 3A on the cage 3.

When rotation of the motor B causes the nut 2 and cage 3 to move upwards the pilot inlet valve 4 is opened to connect supply air to the control chamber 5 of the relay valve and also to the chamber 6 below the pilot valve diaphragm, via a registration choke 7. Pressure builds up on the pilot valve diaphragm until it overcomes the downward force of the control sring 8 whereupon the diaphragm and the exhaust valve 9 move up permitting the inlet valve 4 to close. Thus the pressure built up in the control chamber of the relay is proportional to the movement of the valve cage and hence the degree of rotation of the stepping motor.

The relay valve is of conventional type of large capacity so that the effective way through should have a diameter ¾ inch (approx 2 centimeters).

The application can be increased by increasing the degree of rotation of the motor and released by reversing the rotation which causes the pilot valve cage to move down, thus permitting the spring 8 to open the exhaust valve 9 and release air from the relay valve control chamber and also the pilot valve diaphragm chamber until the pressure balances the spring load, where-upon the exhaust valve will reclose.

Normally magnet valve 12 is energised to connect supply pressure to the upper side of piston 13 which moves it down against spring 14 rendering the spring ineffective. If the magnet valve is de-energised, the chamber above the piston 13 is vented and spring 14 becomes effective to move up the emergency piston 13 the top end of which engages a ring 13A in a groove in the wall of the valve cage 3 thus moving valve cage 3 upwards and causing the brakes to be applied. This would occur for emergency.

However, the amount the spring can move up the valve cage is determined by the position of load cut off stop member 15 the position of which in the taper slot 15A in the valve cage, is determined by the load dependent pressure P acting on the annulus 16A on piston 16 against spring 17. This stop prevents overbraking should there be any electrical failure. The stop member 15 is tapered towards its distal end and is carried by piston 16 for transverse movement relative to the slot 15A in the cage 3. Thus, the position of the piston 16, and hence the member 15, as determined by the load pressure signal P will limit the movement of the axially movable cage 3.

For slide control the stepping motor rapidly moves the cage to the release position under the control of slide control circuitry (not shown).

If jerk limit is required the feed to the relay control chamber can be choked—this choke being by-passed by a spool valve on the emergency piston 13.

By incorporating a magnet valve at point X (FIG. 2) between the pilot valve output and the registration on the diaphragm 18 of the brake cylinder valve 20, it also incorporates slide control. When this occurs the magnet valve is energised to disconnect the pilot valve output from the relay valve registration which is connected to atmosphere. Brake cylinder pressure cause the diaphragm to move up fully, causing the exhaust valve to vent the brake cylinder. If adaptive slide is required the stepping motor, at the same time, sets the pilot valve to give the required adaptive pressure when the slide magnet is de-energised.

I claim:

1. An electro-pneumatic brake system in which an output pneumatic pressure is determined by the opening, in accordance with an electrical signal, of a pneumatic valve, said system comprising a pneumatic valve responsive to a source of pneumatic pressure, two relatively movable members arranged so that a first of the members is movable in an axial direction responsive to rotation of the second member, said first member being connected to the valve, and a stepping motor, having a step-wise rotatable output shaft connected to said second member, for, responsive to the receipt of a said electrical signal, controlling the opening of the pneumatic valve in a series of digital steps so as to provide, downstream of the pneumatic valve, control of the output pneumatic pressure in a variable manner in a series of digital steps.

2. A brake system as claimed in claim 1 wherein the two relatively movable members comprise a threadedly engaged nut and shaft.

3. A brake system as claimed in claim 2 wherein the threaded shaft is integral with the output shaft of the motor and the nut is constrained for relative axial movement.

4. A brake system as claimed in claim 1 wherein the valve has an abutment against which the axially movable member is urged to effect valve movement.

5. A brake system as claimed in claim 1 including a stop arranged to limit movement of the axially movable member, the position of the stop being determined by a load dependent signal.

6. A brake system as claimed in claim 5 wherein the stop comprises a further member engaged with and movable in a transverse direction with respect to a slot in the axially movable member.

7. A brake system as claimed in claim 6 wherein the further member comprises a tapered member carried by a piston movable in said transverse direction, the position of which piston is determined by a load dependent signal.

* * * * *